United States Patent
Klotz (10) Patent No.: US 12,289,058 B2
(45) Date of Patent: Apr. 29, 2025

(54) SYNCHRONOUS FLYBACK CONVERTER CIRCUIT

(71) Applicant: TRIDONIC GMBH & CO KG, Dornbirn (AT)

(72) Inventor: Reimar Klotz, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 28 days.

(21) Appl. No.: 17/439,913

(22) PCT Filed: Mar. 20, 2020

(86) PCT No.: PCT/EP2020/057805
§ 371 (c)(1),
(2) Date: Sep. 16, 2021

(87) PCT Pub. No.: WO2020/188091
PCT Pub. Date: Sep. 24, 2020

(65) Prior Publication Data
US 2025/0015727 A1 Jan. 9, 2025

(30) Foreign Application Priority Data
Mar. 21, 2019 (DE) ............... 10 2019 107 225.5

(51) Int. Cl.
*H02M 3/335* (2006.01)
*H02M 1/00* (2006.01)
*H02M 3/07* (2006.01)

(52) U.S. Cl.
CPC ..... *H02M 3/33592* (2013.01); *H02M 1/0009* (2021.05); *H02M 3/07* (2013.01)

(58) Field of Classification Search
CPC ... H02M 3/33592; H02M 1/0009; H02M 3/07
See application file for complete search history.

(56) References Cited

U.S. PATENT DOCUMENTS

| | | | |
|---|---|---|---|
| 6,961,253 B1 * | 11/2005 | Cohen | H02M 1/08 363/97 |
| 2003/0090914 A1 | 5/2003 | Jansen et al. | |

(Continued)

FOREIGN PATENT DOCUMENTS

| | | |
|---|---|---|
| DE | 102014116337 | 5/2015 |
| JP | 2011004595 | 1/2011 |

OTHER PUBLICATIONS

English translation of Search Report and Written Opinion dated May 13, 2020 in priority PCT Application PCT/EP2020/057805.
(Continued)

*Primary Examiner* — Kyle J Moody
(74) *Attorney, Agent, or Firm* — Andrus Intellectual Property Law, LLP (57) ABSTRACT

The present invention relates to a flyback converter circuit (3) which has: a first controllable switch (8) with a capacitor (14); a second controllable switch (11); a transformer (7) with a primary winding (6) which is coupled to the first switch (8) and a secondary winding (10) which is coupled to the second switch (11); a controller (13) which is configured to switch off the second switch (11) when the current through the second switch (11) has reached a negative value after it has decreased to zero, the capacitor (14) being charged after the first switch (8) is switched off and discharged after the second switch (11) is switched off; and means (1) for establishing the discharge rate of the capacitor (14) in order to determine the current flowing through the second switch (11) at the time at which it is switched off.

9 Claims, 6 Drawing Sheets

(56) References Cited

U.S. PATENT DOCUMENTS

| 2014/0153292 A1 | 6/2014 | Yan et al. |
| 2018/0294731 A1 | 10/2018 | Song et al. |
| 2018/0294734 A1 | 10/2018 | Song et al. |
| 2018/0294735 A1 | 10/2018 | Song et al. |

OTHER PUBLICATIONS

Search Report and Written Opinion dated May 13, 2020 in priority PCT Application PCT/EP2020/057805.
EP20714962.6, Intention to Grant dated Mar. 5, 2024.

* cited by examiner

SYNCHRONOUS FLYBACK CONVERTER CIRCUIT

CROSS REFERENCE TO RELATED APPLICATIONS

The present application is the U.S. national stage application of international application PCT/EP2020/057805 filed Mar. 20, 2020, which international application was published on Sep. 24, 2020 as International Publication WO 2020/188091 A1. The international application claims priority to German Patent Application 10 2019 107 225.5 filed Mar. 21, 2019.

FIELD OF THE INVENTION

The present invention relates to a flyback converter circuit and a method for controlling a flyback converter circuit. The invention relates in particular to a clocked flyback converter for use in an operating device for illuminants, in particular, light-emitting diodes.

BACKGROUND OF THE INVENTION

A flyback converter, also called a buck/boost converter, is a DC/DC converter that, in a galvanically decoupled manner, transfers electrical energy between an input side and an output side by means of a transformer. With a flyback converter, a direct voltage supplied to the input can be converted with little circuit complexity into a direct voltage of a different voltage level, wherein the difference in level can be influenced in a simple manner by the choice of the winding ratio of the transformer.

US 2014/0153292 A1 discloses a clocked flyback converter circuit in which, for clocking the flyback converter, a controller selectively, at a specific frequency and duty cycle, switches on and off a switch coupling the primary coil of the transformer to ground. US 2014/0153292 A1 proposes using such a clocked flyback converter circuit for directly supplying light-emitting diodes (LEDs), wherein the current flowing through the controllable switch is detected by means of a measuring resistor, and the switch is switched off as soon as the detected current reaches a prespecified threshold value for the maximum switch current (peak current value).

According to US 2014/0153292 A1, in order to regulate the output power, the threshold value is adapted to the determined deviation between the current output to the light-emitting diodes and a prespecified target output current. The current output to the light-emitting diodes is established by means of the voltage output by a primary-side auxiliary winding of the transformer, which makes it possible to maintain the galvanic isolation, wherein the time of the falling edge is determined in the course of the voltage in order to establish the duration of the current flow through the secondary winding in the blocking phase.

This has the disadvantage that an auxiliary winding is necessary for the detection of the secondary-side current, which makes the overall structure complex and expensive. In addition, establishing the current output to the light-emitting diodes on the basis of the current flow duration is imprecise.

US 2018/0294734 A1 discloses a synchronous flyback converter circuit in which, when the current through the second switch has reached a negative value after it has decreased to zero, the second switch replacing the diode required on the secondary side is switched off in order to discharge parasitic capacitors by means of the negative magnetizing current, and to enable safe zero-voltage switching of the first switch on the primary side. The current generated in this way for the discharge of the parasitic capacitors depends on the level of the current flowing through the second switch at the switching-off time and on the structure of the transformer (inductance L and winding ratio n), wherein the level of the current flowing through the second switch depends on the time span t from the time of the current zero crossing until the switching-off time and on the voltage of the buffer capacitor or on the voltage U output by the flyback converter circuit. According to US 2018/0294734 A1, the amplitude of the negative magnetizing current I can be established by means of the formula, $I = n/L \cdot U \cdot t$.

In order to adapt the current prespecified for discharging the parasitic capacitors to different voltages to be output by the flyback converter circuit, US 2018/0294734 A1 proposes detecting the voltage output by the flyback converter circuit and varying the time span according to the detected voltage.

SUMMARY OF THE INVENTION

The invention is based on the aim of specifying devices and methods which alleviate the described problems. The aim is, in particular, to provide a flyback converter circuit, an operating device for the operation of one or more illuminants, in particular, LEDs, and a method for controlling a flyback converter circuit, which allow precise control and regulation over a large load range with a simple and cost-effective structure.

This aim is achieved according to the features of the independent claims. The invention is developed by the features of the dependent claims.

According to the present invention, a flyback converter circuit has a first controllable switch with an external capacitor that is parasitic or connected in parallel, a second controllable switch, a transformer with a primary winding which is coupled to the first switch and a secondary winding which is coupled to the second switch, a controller which is configured to switch off the second switch when the current through the second switch has reached a negative value after it has decreased to zero, wherein the capacitor formed in parallel to the first switch is charged after the first switch is switched off and discharged after the second switch is switched off, and means for establishing a measure of the discharge rate of the capacitor in order to determine the current flowing through the second switch at the time it is switched off.

The discharge rate is an indicator of the secondary negative current at the time of switching off the second switch, which can be used to control the (negative) peak current without directly detecting the voltage output by the flyback converter circuit on the secondary side or the voltage at the buffer capacitor.

Alternatively or additionally, the voltage output by the flyback converter circuit can be determined since the voltage on the primary side of the transformer during the demagnetization phase (starting after opening the primary-side switch, given a known winding ratio n of the transformer) is proportional to the voltage on the secondary side of the transformer due to the coupling ratio of the transformer. When the secondary-side switch is closed, the voltage at the buffer capacitor or the voltage U output by the flyback converter circuit corresponds to the voltage across the secondary side of the transformer.

In the flyback converter circuit, the second switch replaces the diode required on the secondary side or is connected in parallel thereto. This allows a reversal of the energy flow, viz., from the buffer capacitor provided on the secondary side to the primary side (synchronous flyback converter circuit). The current flowing through the second switch during reversal immediately before the second switch is switched off depends on the switching-off time and on the charge of the buffer capacitor or on the voltage output by the flyback converter circuit, and, due to the switching-off on the primary side, causes a discharge of the capacitor connected in parallel to the first switch, wherein the discharge rate depends on the level of the current flowing through the second switch at the time it is switched off. According to the present invention, the current flowing through the second switch at the time it is switched off or the voltage output by the flyback converter circuit is determined in a simple manner via the primary-side establishment of the discharge rate.

The discharge rate indicates the amount by which the charge level of the capacitor decreases within a specific period of time after the second switch is switched off or how long a specific decrease in the charge level lasts. It can be determined by means of the time curve of the voltage output by the capacitor and/or the time curve of the discharge current of the capacitor.

After a prespecified time has elapsed, the controller can switch off the second switch after the current through the second switch (or the diode if present) has decreased to zero, so that no connection to the primary side is necessary for controlling the second switch. Alternatively, the controller may control both the first switch and the second switch. Additionally or alternatively, the controller can change the switching-off time of the second switch or the prespecified time on the basis of the current determined to be flowing at the switching-off time, in order, for example, to improve the establishment of the measure of the discharge rate and/or to correct a deviation in the current prespecified for the discharge of the parasitic capacitors.

The determination of the current flowing through the second switch at the time it is switched off and the corresponding control of the second switch can take place in each switching cycle or only at specific times or events (start-up phase, change in dimming level, change from continuous or limit operation to discontinuous operation).

The controller can be configured to control at least the first switch on the basis of the determined current in order, for example, to maintain or adjust a prespecified output power.

The first switch can be a transistor, and the capacitor can be formed by the drain-source capacitance of the transistor and/or a snubber capacitor coupled to the drain and source connectors of the transistor so that no or only a small additional capacitor is required.

The means for establishing the measure of the discharge rate may be configured to establish the time period from the time when the second switch is switched off to the time at which the voltage across the capacitor has dropped to a specific value. The switching-off time can be determined on the basis of the switch-off signal for the second switch or from the course of the voltage across the capacitor.

Establishing the time at which the voltage across the capacitor has dropped to a specific value can be effected by means of a comparator, which compares the voltage applied to the capacitor with the specific value.

The voltage across the capacitor can be measured directly or by using a voltage divider. Alternatively, the transformer can have a primary-side auxiliary winding, wherein the means for establishing the measure of the discharge rate is configured to determine the voltage, applied to the capacitor, by means of the voltage output by the auxiliary winding.

The dependence of the discharge rate on the current flowing at the time of switching-off can be determined by the manufacturer or user by measuring the discharge rate and the current flowing through the second switch at the time it is switched off or the voltage output by the flyback converter circuit, and be stored in the form of a table or formula for determination during operation, wherein the controller or the means for establishing the discharge rate is configured to determine the current, flowing through the second switch at the time it is switched off, by means of the table or the formula, which indicates a current for the determined discharge rate.

If the discharge rate is dependent on further factors, such as operating mode, duty factor, dimming level, and/or the current flowing through the first switch, a table or formula can in each case be created for at least some operating modes, duty factors, or dimming levels, wherein the controller or the means for establishing the measure of the discharge rate is configured to select the corresponding table or formula from a plurality of tables or formulas on the basis of the current flowing through the first switch, the duty factor of the control of at least the first switch, and/or a dimming signal controlling the flyback converter circuit.

According to the present invention, an operating device for illuminants has a flyback converter circuit with one of the embodiments described above.

According to the present invention, a method for controlling the flyback converter circuit comprises the following steps:
Controlling the first and second switches in order to convert a direct voltage supplied to the input of the flyback converter circuit, wherein the second switch is switched off after the current through the second switch has decreased to zero and reached a negative value,
Establishing a measure of the discharge rate of the capacitor, and
Determining the current flowing through the second switch at the time it is switched off or on the basis of the determined discharge rate.

BRIEF DESCRIPTION OF THE DRAWINGS

The invention is explained in more detail in the following using the accompanying drawings. The following are shown.

DETAILED DESCRIPTION

Components with the same functions are identified by the same reference signs in the figures.

Figure 1:
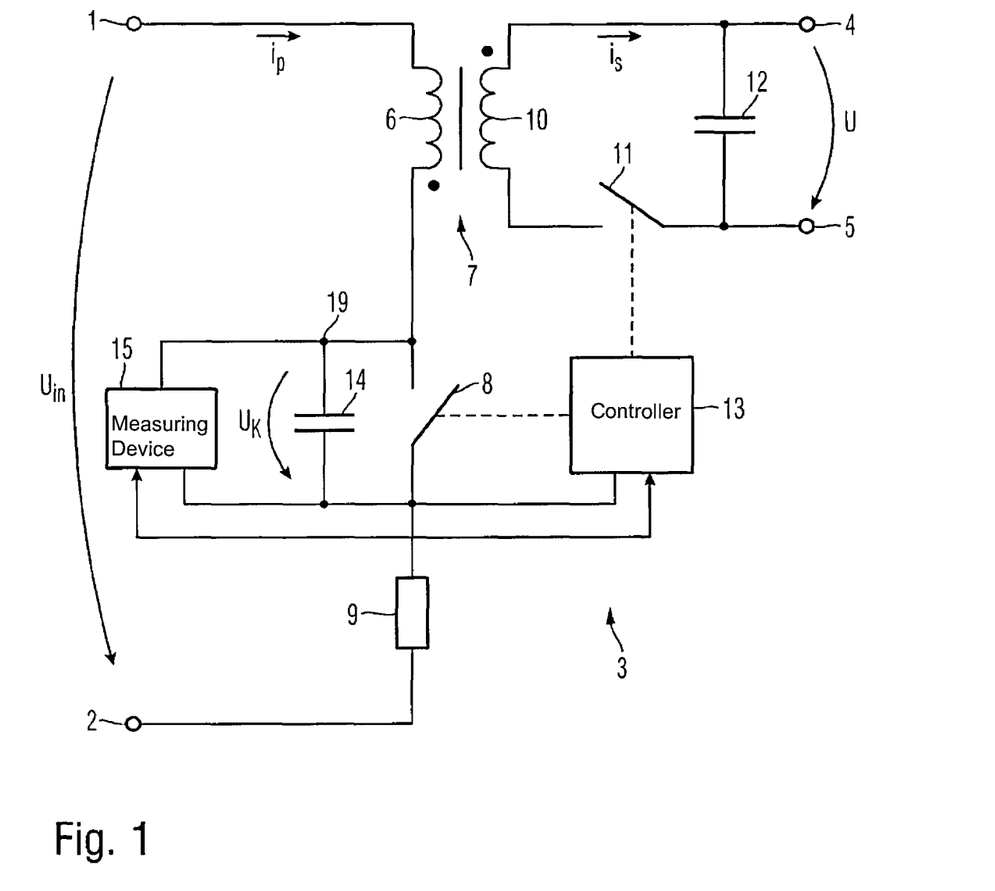
FIG. 1 a clocked flyback converter circuit according to a first exemplary embodiment according to the present invention, FIG. 2 three diagrams with the curves of the currents flowing through the primary and secondary windings of the flyback converter circuit shown in FIG. 1 and the curve of the voltage across the capacitor, FIG. 3 a schematic representation of the structure of the measuring device according to an exemplary embodiment according to the present invention, FIG. 4 a clocked flyback converter circuit according to a second exemplary embodiment according to the present invention, FIG. 5 an operating device for illuminants according to an exemplary embodiment according to the present invention, and FIG. 6 a simplified flowchart for illustrating the method according to the present invention.

FIG. 1 shows a simplified circuit of a synchronous flyback converter according to a first exemplary embodiment according to the present invention. A supply voltage is supplied to the two input ports 1, 2 of the flyback converter circuit 3 shown, which supply voltage is a direct voltage or a rectified alternating voltage and is converted into a direct voltage at a different voltage level and output to two output ports 4, 5 of the flyback converter circuit 3. Illuminants, e.g., LEDs, or a further converter (not shown) can be connected to the two output ports 5.

The primary winding 6 of the transformer 7, a first controllable switch 8, and a measuring resistor 9 are connected in series between the first input port 1 and the second input port 2, which is connected to ground. The secondary winding 10 of the transformer 7 and a second controllable switch 11 are connected in series between the first output port 4 and the second output port 5. A buffer/storage capacitor 12 is coupled in parallel to the output ports 4, 5. The primary and secondary windings 6, 10 of the transformer 7 have a different polarity/winding direction. The first switch 8 and the second switch 11 can be transistors, such as IGBTs or MOSFETs, and are controlled by a controller 13 in order to switch them on and off.

The controller 13 is preferably arranged on the primary side of the flyback converter circuit 3 and controls the second controllable switch 11 across the potential barrier. By contrast, the detection of measurands but also the control of the first controllable switch 8 preferably take place without electrical isolation on the primary side.

If the first controllable switch 8 is open, a capacitor closes the primary-side circuit. This capacitor may be a parasitic capacitor or, as shown in FIG. 1, a capacitor 14 which is formed in parallel to the first switch 8 so that this capacitor closes the primary-side circuit when the first switch 8 is opened. The capacitor 14 is connected in series to the primary winding 6 and the measuring resistor 9, wherein a measuring device 15 detects the charge state or voltage uK at the capacitor 14. After the first switch 8 is switched on, the capacitor 14 is bridged, and a current iP flows through the primary winding 6 of the transformer 7, wherein the switched-off second switch 11 suppresses a current flow on the secondary side. The current flow iP through the first switch 8 is established by means of the voltage dropping across the measuring resistor 9 and detected by the controller 13, which voltage switches the first switch 8 off and the second switch 11 on when the current iP reaches a threshold value.

It should be noted that a capacitor formed in parallel to the first switch 8 is generally present for the invention. In order to explain the invention, this capacitor is shown as capacitor 14, which forms the capacitor, at least in part.

After the first switch 8 is switched off (blocking phase), the capacitor 14 is charged, and the energy stored in the primary winding 6 is output via the secondary winding 10 of the transformer 7 in a demagnetization phase, which generates a current flow iS on the secondary side through the second switch 11, which feeds the buffer capacitor 12. The current flow is on the secondary side decreases linearly and finally becomes zero. Since the second switch 11 is initially still closed, the buffer capacitor 12 then drives a current is in the opposite direction through the secondary winding 10 and the second switch 11, which is finally switched off by the controller 13. This leads to a current flow iP on the primary side, which, due to the magnetic coupling of the transformer, discharges the capacitor 14 again.

Alternatively, the second switch 11 can be switched on only after the first switch 8 is switched off, in order to avoid undesired damage to the components, wherein there can be a short time period tdead between the switching-off of the first switch 8 and the switching-on of the second switch 11. The parasitic diode (see FIG. 4) usually contained in the second switch 11 makes rapid commutation possible. However, the second switch 11 should be switched on quickly in order to avoid unnecessary losses.

The measuring device 15 determines the discharge rate or a time period until a prespecified voltage value of the capacitor 14 is reached, which depends on the current is flowing through the second switch 8 at the time it is switched off or on the voltage applied to the output ports 4, 5. For this purpose, the measuring device 15 receives a signal from the controller 13 which indicates the time at which the second switch 11 was switched off and determines the time period between the switching-off time to the time at which the voltage at the capacitor 14 has fallen to a specific limit value. On the basis of the time period determined, the measuring device 15 or the controller 13 establishes the current flowing through the second switch 11 at the time when it is switched off or the voltage U output by the flyback converter circuit 3.

Figure 2:
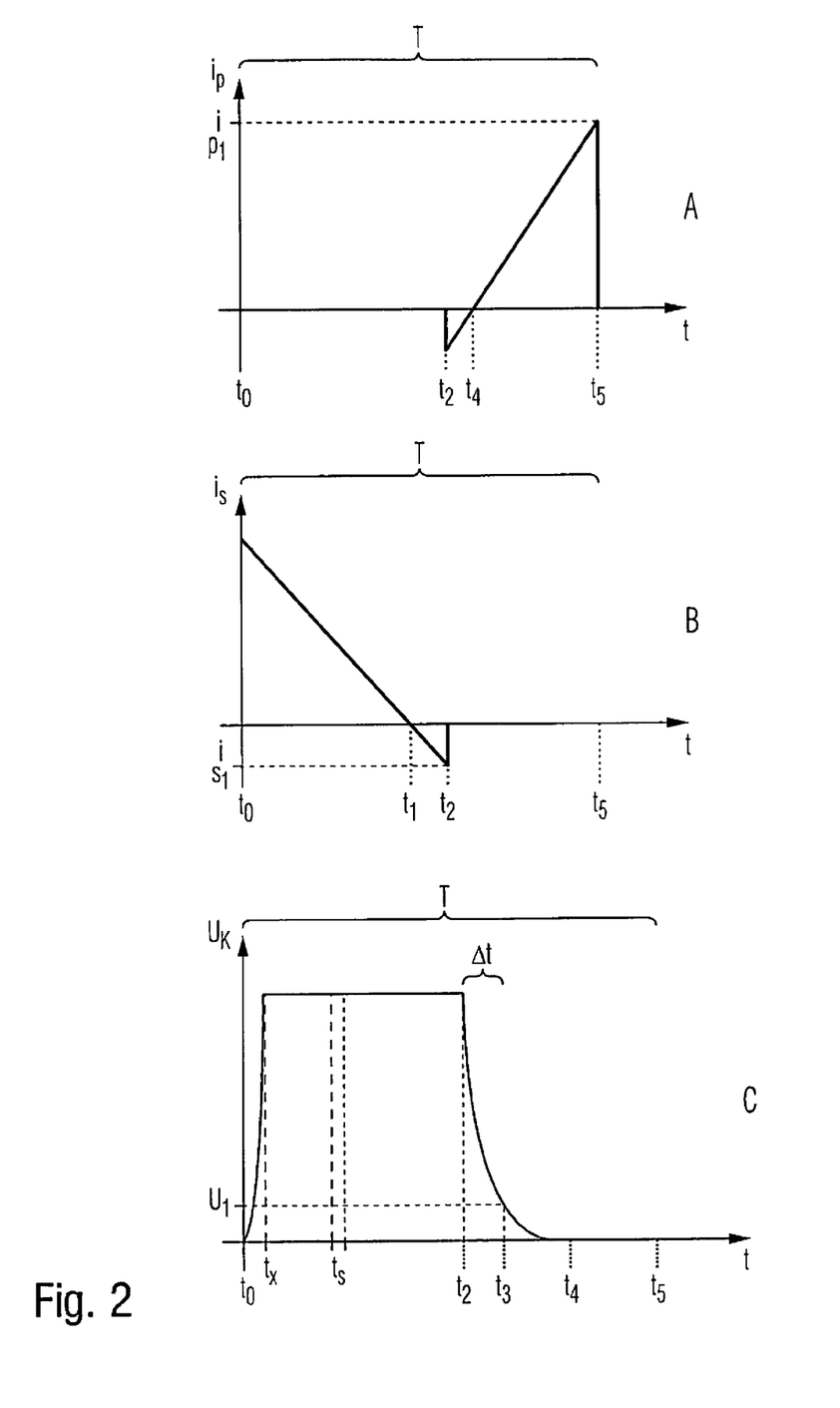

FIG. 2 shows, in diagram A, the curve of the current iP through the primary winding 6 for a switching cycle T (t0 to t5); in diagram B, the curve of the current is through the secondary winding 10 for the switching cycle T; and, in diagram C, the curve of the voltage uK for the switching cycle T. At time t0, the first switch 8 is open, and the second switch 11 is closed.

As soon as the first switch 8 is opened and the second switch 11 is closed, a secondary-side current is begins to flow on the secondary side. As soon as the second switch 11 is closed and a secondary-side current is flows, the voltage U output by the voltage at the buffer capacitor 12 or the voltage U output by the flyback converter circuit 3 corresponds to the voltage across the secondary side of the transformer, i.e., the voltage across the secondary winding 10. During the now present demagnetization phase of the secondary winding 10, the voltage on the primary side of the transformer 7, i.e., across the primary winding 6, is proportional to the voltage on the secondary side of the transformer 7. This proportional voltage ratio results from the coupling ratio of the transformer 7 (i.e., the known winding ratio n of the transformer 7). The demagnetization phase of the secondary winding 10 begins after the first switch 8 is opened and the second switch 11 is closed at the same time.

Thus, in the time period after the closing of the second switch 11 up to time t2, i.e., as long as a secondary-side current is flows, the voltage U output by the flyback converter circuit 3 can also be detected with the aid of the indirect detection of the voltage across the secondary winding 10, for example, by a measurement in the time period between t0 and t2.

This indirect detection of the voltage U output by the flyback converter circuit 3 preferably takes place by sampling the primary voltage at time ts during the duty cycle of the second switch 11.

At time to, the first switch 8 is opened and the second switch 11 is closed. By the opening of the first switch 8, the current on the primary side is interrupted by the first switch 8, and the voltage across the first switch 8 rises immediately. The capacitor 14 is thus charged since a current is now flows on the secondary side due to the closing of the second switch 11 and due to the magnetization of the secondary winding 10. As already mentioned, due to the magnetic coupling, the voltage of the secondary winding 10 is transferred to the primary winding 6 in accordance with the winding ratio n of the transformer. After time t0, the voltage across the capacitor 14 thus rises until the latter is charged. Due to the low capacitance of the capacitor 14, the phase up until time tx is very short. During the demagnetization of the secondary winding 10, the current is decreases linearly. At t1, the current is has reached zero and subsequently becomes negative (since, as already explained, the second switch 11 initially continues to be closed, the buffer capacitor 12 continues to drive a current is in the opposite direction through the secondary winding 10). As long as the current is flows on the secondary side, the voltage across the primary winding 6 and thus the voltage across the capacitor 14 remains almost constant. At time t2, the second switch 11 is opened, and the first switch 8 remains open, whereupon the current flow is is interrupted by the second switch 11. When the voltage across the secondary winding 10 and thus also the primary winding 6 ceases, the capacitor 14 starts discharging, and a negative current iP begins to flow. As described above, a delay time tdead can be provided between the switching on and off of the two switches 8, 11, in order to reduce the risk of damage to the components.

During the demagnetization phase of the secondary winding 10 and also the subsequent phase of the discharge of the buffer capacitor 12, i.e., up until time t2, an electrical circuit is formed on the primary side by the input voltage (between 1 and 2), the primary winding 6, and the capacitor 14. Knowing the values of the input voltage (voltage across 1 and 2) and the voltage uK across the capacitor 14, the voltage across the primary winding 6 can thus be deduced. By detecting the voltage uK across the capacitor 14, the voltage across the primary winding 6, and thus also the voltage U output by the flyback converter circuit 3, can thus be deduced.

As soon as the second switch 11 is opened, the current is flowing on the secondary side is interrupted. Since current is now no longer flowing through the secondary winding 10, the voltage across the secondary winding 10 collapses, and thus also the voltage across the primary winding 6. As long as the first switch 8 is still open, the voltage across the capacitor 14 now decreases, as a result of which a negative current iP begins to flow.

The measuring device 15 measures the time period $\Delta t$ from the time t2 to the time t3, at which the falling voltage uK reaches the limit value u1. The drop in the voltage uK from a constant output value, or an output value reached in each switching cycle T, at time t2 to the limit value u1 within the time period $\Delta t$ is a measure of the discharge rate. On the basis of the measured time period $\Delta t$, which indicates the discharge rate, the controller 13 or the measuring device 15 determines the value is1 that the current is has reached at time t2, and/or the voltage at the output ports 4, 5 by means of a table or formula that assigns a current value or voltage value to each measured time period $\Delta t$.

At time t4, the first switch 8 is closed, and the second switch 11 remains open. The current iP increases until it reaches the threshold value iP1 at time t5, and the first switch 8 is opened and the second switch 11 is closed. The threshold value iP1 can be set by the controller 13 as a function of a received dimming signal and/or of the determined current value or voltage value, wherein the threshold value iP1 is increased if the determined current value or voltage value falls below a prespecified value, and is reduced if the determined current value or voltage value is greater than the prespecified value. The first switch 8 can be switched on after a waiting time has elapsed, which begins when the second switch 11 is switched off at time t2 and is greater than the maximum time period $\Delta t$ to be expected. Alternatively, the first switch 8 can be switched on when the falling voltage uK has reached the limit value u1.

Before normal operation, the table or formula can be established experimentally by measuring the discharge rate or the time period $\Delta t$ and the associated current is1 for various load states at the flyback converter circuit 3 itself or at a model of identical design and stored in the controller 13 or the measuring device 15.

It is also possible, in a learning or calibration mode activatable by the user/fitter, for the flyback converter circuit 3 to output various currents or voltages at the output ports 4, 5 according to a prespecified pattern, in order to assume various load states, and for the controller 13 or the measuring device 15 to query for each load state a signal, indicative of the output current and/or the output voltages, via an internal connection connected in the learning/calibration mode, or to receive it via a wired or wireless connection present outside the circuit between the output ports 4, 5 and an interface of the controller 13, to measure the time period $\Delta t$, and to record the measured time period $\Delta t$ together with the associated current and/or voltage value in the table or to correct an existing entry in the table. The table is stored in a storage device (not shown) of the flyback converter 3.

If the time period $\Delta t$ is dependent on further factors, such as operating mode, duty factor, or dimming level, a table or a multi-dimensional table can be created in each case for various operating modes, duty factors, or dimming levels which table assigns a current value and/or voltage value to a specific combination of different factors and values, including the time period $\Delta t$. In normal operation, the controller 13 or the measuring device 15 establishes the table to be applied or the present combination in order to determine the current value and/or voltage value.

Figure 3:
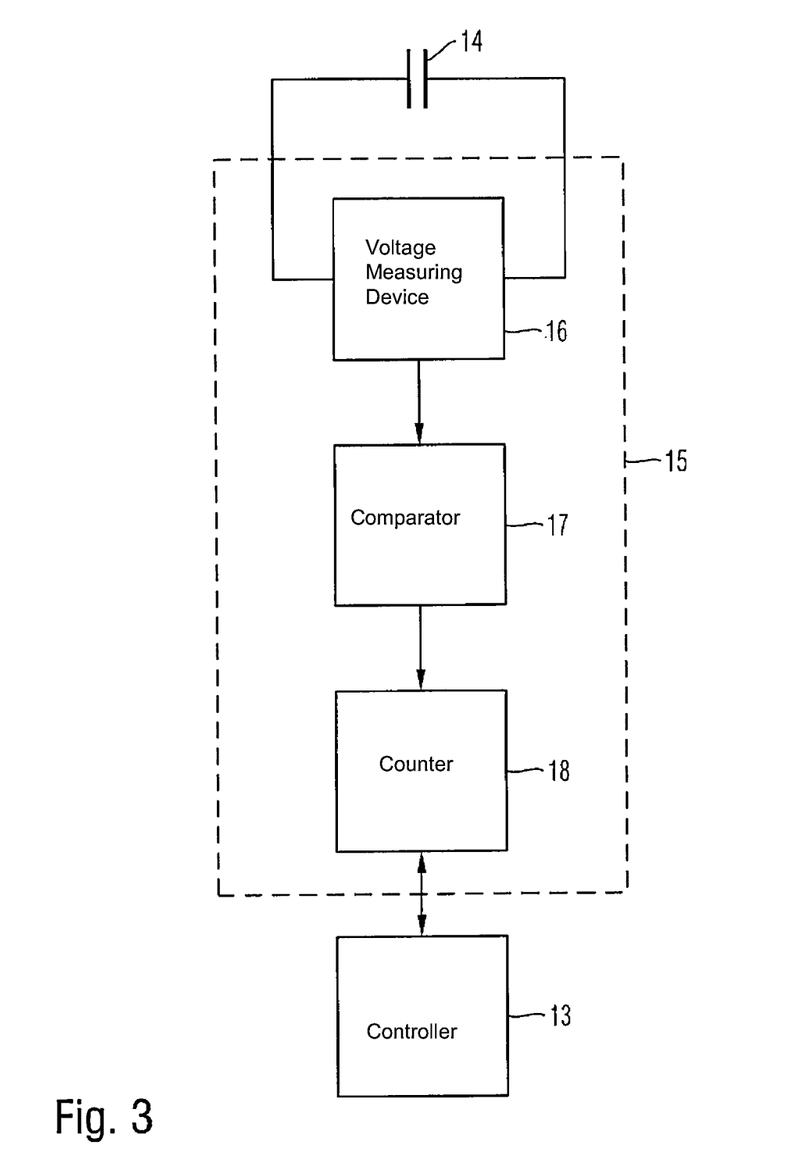

FIG. 3 shows the structure of the measuring device 15, which comprises a voltage measuring device 16 for measuring the voltage of the capacitor 14, a comparator 17 for comparing the measured voltage uK with the limit value u1 and outputting a stop signal, and a counter 18, which receives the stop signal from the comparator 17 and receives a start signal from the controller 13 when the second switch 11 is opened at time t2. The counter 18 starts measurement of the time period $\Delta t$ when the start signal is received, ends measurement when the stop signal is received, and outputs the measured time period $\Delta t$ to the controller 13. Alternatively, the counter 18 may start measurement of the time period $\Delta t$ when a falling edge of the voltage uK is detected. This enables the time period $\Delta t$ to be measured without an external start signal. In addition, no signal transmission between the primary and secondary sides is necessary if the second switch 11 has its own, secondary-side controller which automatically switches off the second switch 11 after a prespecified waiting time, which begins when the current is drops to zero at time t1.

Alternatively, the measuring device 15 can only start the counter 18 when the voltage uK has fallen to a limit value that is greater than the limit value u1, and stop the counter 18 when the limit value u1 is reached.

If the current generated by switching off the second switch 11 on the secondary side is too low or too high, this current can be changed to a prespecified extent by increasing or decreasing the time span t1-t2 or by shifting the switching-off time t2, wherein a table is assigned to each adjustable time span t1-t2. Alternatively or additionally, the limit value u1 can be changed to a prespecified extent, e.g., if the limit value u1 is not reached within a prespecified time.

In the example shown in FIG. 1, the voltage uK of the capacitor 14 is measured directly across the capacitor 14.

However, it is also possible to measure the voltage uK by means of a voltage divider between the input port 2 and a circuit point 19 located between the primary coil 6 and the capacitor 14.

In discontinuous operation in particular, due to parasitic effects after the first switch 8 (and also the second switch 11) have been switched off, oscillations of the voltage across the respective switch can occur. In order to avoid switching losses of the switch, such oscillations should be taken into account when selecting the restart time, or the restart time should be selected such that at the restart time, the curve of the voltage across the switch has a voltage minimum or a zero crossing with rising edge (zero crossing after a voltage minimum). The time of the zero crossing or information about the voltage curve can be determined by the measuring device 15 in addition to the time period Δt and transmitted to the controller 13 for establishing the optimal switch-on time (time t4).

In order to establish the switch-on time in flyback and other converter circuits, the voltage curve is often detected by means of an auxiliary winding that is coupled to the transformer 7 or to the connected coil serving as an intermediate energy store. Such an auxiliary winding 20 can be used to determine the discharge rate of the capacitor 14, in particular if it is already provided for establishing the switch-on time.

Figure 4:
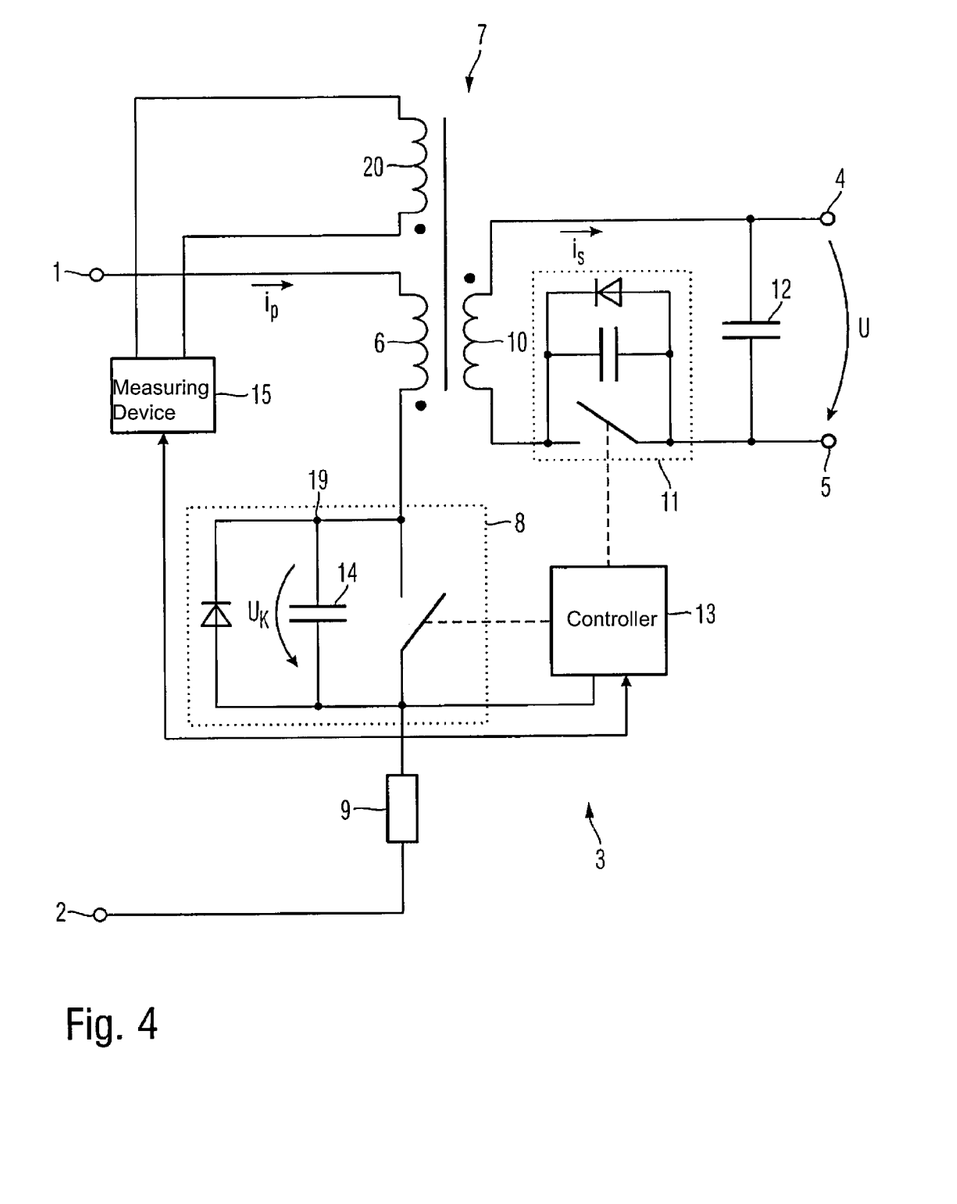

FIG. 4 shows a flyback converter circuit 3 according to a second exemplary embodiment according to the present invention, in which instead of the voltage uK is detected by the measuring device 15 as primary-side voltage by means of an auxiliary winding 20 of the transformer 7. The auxiliary winding 20 is magnetically coupled to the primary winding 6 and the secondary winding 10. As already described with reference to FIG. 2, evaluation of the voltage across the primary winding 6 can be used to detect the voltage across the secondary winding 10 and thus also the voltage U output by the flyback converter circuit 3. Given a suitable winding ratio, detection can be effected directly or, in the case of very high voltages at the auxiliary winding 20, via a voltage divider. The measuring device 15 measures the time period Δt according to one of the methods described above and outputs the result to the controller 13. The measuring device 15 may be an integrated semiconductor circuit, comprise an integrated semiconductor circuit, or be part of the controller 13. The controller 13 can be designed as a processor, a microprocessor, a controller, a microcontroller, an application-specific integrated circuit (ASIC), or a combination of said units.

In the flyback converter circuit 3 shown in FIG. 4, the first switch 8 and the second switch 11 are metal-oxide semiconductor field effect transistors (MOSFETs) and are in each case shown as a simplified equivalent circuit diagram. As can be seen from the equivalent circuit diagram, the first switch 8 designed as a MOSFET has a capacitive element that is caused by the barrier layer capacitance of the internal diode and forms the capacitor 14 in the form of a parasitic capacitance of the switch 8, which closes the circuit when the first switch 8 is open. In the exemplary embodiment shown, however, the voltage of the auxiliary winding 20 is evaluated in order to determine the current is flowing through the second switch 11 at the time it is switched off. Alternatively, however, the voltage across the capacitor 14 could, in turn, also be evaluated.

As an alternative to the exemplary embodiments, the capacitor 14 can be a snubber capacitor that is connected in parallel to the first switch 8 and is intended to dampen interfering high frequencies or voltage spikes that occur when switching inductive loads.

Figure 5:
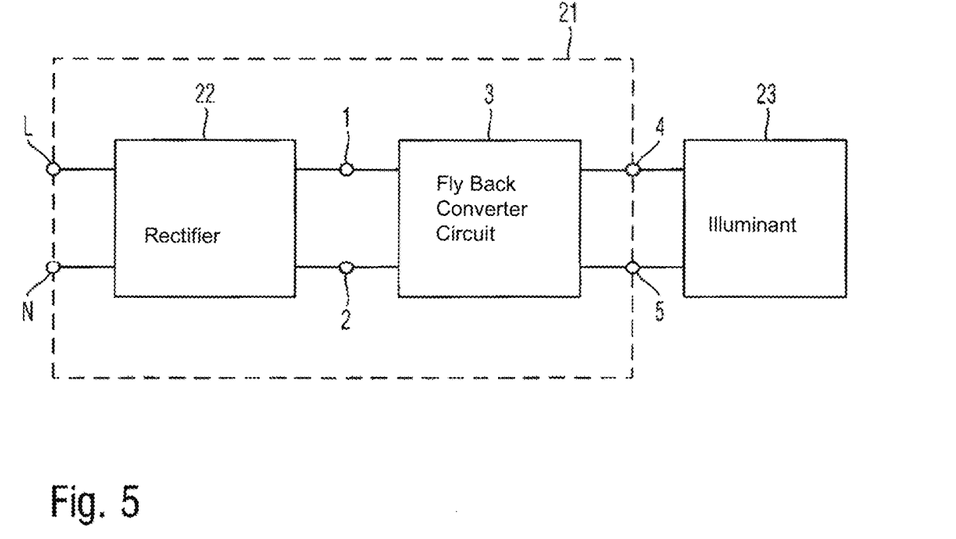

FIG. 5 shows an operating device 21 for illuminants according to an exemplary embodiment according to the present invention. The operating device 21 has the flyback converter circuit 3 shown in FIG. 1 or 4, a mains connection L, N for connecting the operating device 21 to a mains AC voltage, and a rectifier 22 with power factor correction, which, from the mains AC voltage, generates the DC voltage applied to the input ports 1, 2 of the flyback converter circuit 3. The flyback converter circuit 3 converts the DC voltage into a voltage for operating an illuminant 23 connected to the output ports 4, 5 of the flyback converter circuit 3 and consisting of several LEDs. The flyback converter circuit 3 preferably outputs a regulated current.

Figure 6:
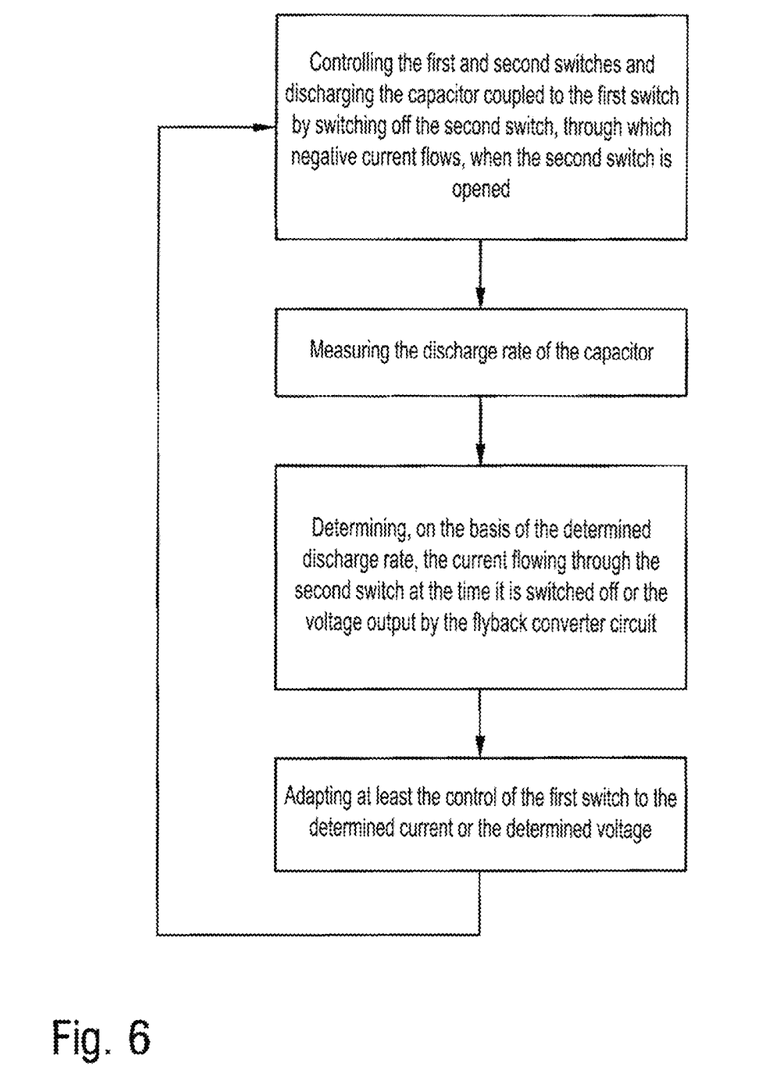

FIG. 6 shows a highly simplified flowchart showing the individual steps in carrying out the method described in detail above.

The invention claimed is:

1. A flyback converter circuit (3) comprising:
   a first controllable switch (8) having a parasitic or an external capacitor (14) that is connected in parallel;
   a second controllable switch (11);
   a transformer (7) with a primary winding (6) which is electrically connected to the first switch (8) and a secondary winding (10) which is electrically connected to the second switch (11);
   a controller (13) which is configured to switch off the first switch (8) at a point in time and switch on the second switch, the capacitor being charged, and to switch off the second switch (11) when the current through the second switch (11) has reached a negative value after it has decreased to zero, the capacitor (14) being discharged after the second switch (11) is switched off; and
   means (15) for ascertaining a measure of the discharge rate of the capacitor (14) in order to determine the current flowing through the second switch (11) at the point in time when the second switch is switched off;
   wherein the controller (13) is configured to control at least the first switch (8) on a basis of the determined current.

2. The flyback converter circuit (3) according to claim 1, wherein the first switch (8) is a transistor, and the capacitor (14) is formed by a drain-source capacitance of the transistor and/or a snubber capacitor coupled to drain and source connectors of the transistor.

3. The flyback converter circuit (3) according to claim 1, wherein the means (15) for ascertaining a measure of the discharge rate is configured to ascertain a time period from a time when the second switch (11) is switched off to a time at which a voltage across the capacitor (14) has fallen to a specific value.

4. The flyback converter circuit according to claim 3, wherein the means (15) for ascertaining the measure of the discharge rate has a comparator (17) for comparing the voltage, having a specific value, applied to the capacitor (14).

5. The flyback converter circuit (3) according to claim 1, wherein
   the transformer (7) has a primary-side auxiliary winding (20), and
   the means (15) for ascertaining the measure of the discharge rate is configured to determine a voltage applied to the capacitor (14) by means of a voltage output by the auxiliary winding (20).

6. The flyback converter circuit (3) according to claim 1, wherein the controller (13) or the means (15) for ascertaining the measure of the discharge rate is configured to determine a current flowing through the second switch (11) at a point in time it is switched off by means of a table or formula which indicates a current for the determined measure of the discharge rate.

7. The flyback converter circuit (3) according to claim 6, wherein the controller (13) or the means (15) for ascertaining the measure of the discharge rate is configured to select the table from a plurality of tables on the basis of the current flowing through the first switch (8), a duty factor of the control of at least the first switch (8), and/or a dimming signal controlling the flyback converter circuit (3).

8. An operating device (21) for illuminants (23), which has at least one of the flyback converter circuits (3) according to claim 1.

9. A method for controlling a flyback converter circuit (3) which has a first controllable switch (8) with a parasitic capacitor (14) or an external capacitor that is connected in parallel, a second controllable switch (11), a transformer (7) with a primary winding (6) which is electrically connected to the first switch (8) and a secondary winding (10) which is electrically connected to the second switch (11), comprising the steps of:

controlling the first and second switches (8, 11) in order to convert a DC voltage supplied to an input of the flyback converter circuit (3) by switching off the first switch (8) at a first point in time, the capacitor being charged, switching on the second switch (11) at the first point in time, and switching off the second switch (11) when a current through the second switch (11) has reached a negative value after it has decreased to zero, the capacitor being discharged after the second switch is turned off;

ascertaining a measure of a discharge rate of the capacitor (14); and determining a current flowing through the second switch (11) at the point in time when it is switched off on a basis of the determine discharge rate, and switching on the first switch (8) on the basis of the determined current.

* * * * *